Nov. 23, 1971

W. JURISCH ET AL  3,621,657

CONTROL INSTALLATION FOR THE AUTOMATIC ADJUSTMENT OF THE
MOVABLE GUIDE BLADES, ESPECIALLY OF THE OUTPUT
TURBINE OF A GAS TURBINE DRIVE UNIT

Filed Sept. 25, 1968  3 Sheets-Sheet 1

INVENTORS
WILHELM JURISCH
GERHARD WALLISER

BY *Craig & Antonelli*
ATTORNEYS

INVENTORS
WILHELM JURISCH
GERHARD WALLISER

BY Craig & Antonelli
ATTORNEYS

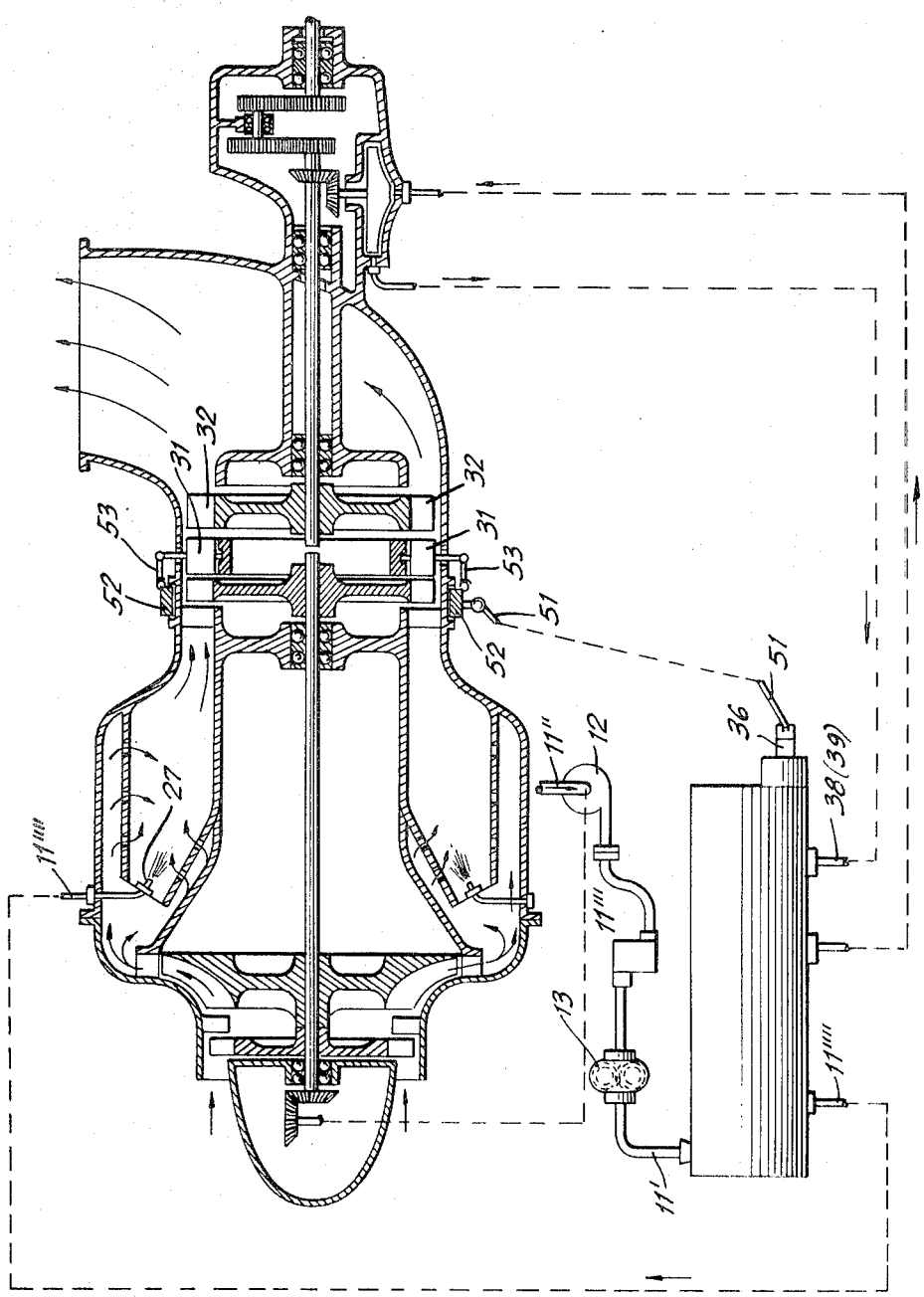

United States Patent Office 3,621,657
Patented Nov. 23, 1971

3,621,657
CONTROL INSTALLATION FOR THE AUTOMATIC ADJUSTMENT OF THE MOVABLE GUIDE BLADES, ESPECIALLY OF THE OUTPUT TURBINE OF A GAS TURBINE DRIVE UNIT
Wilhelm Jurisch, Nellingen-Parksiedlung, and Gerhard Walliser, Waiblingen, Germany, assignors to Daimler-Benz Aktiengesellschaft, Stuttgart-Untertürkheim, Germany
Filed Sept. 25, 1968, Ser. No. 762,579
Int. Cl. F02c 3/10, 3/24; F02g 3/00
U.S. Cl. 60—39.16
24 Claims

ABSTRACT OF THE DISCLOSURE

A control installation for the automatic adjustment of the movably arranged guide blades, especially of the output turbine, of a gas-turbine drive unit which includes an output turbine mechanically separate from the gas producer and serving, in particular, for the drive of a vehicle; the installation includes a system for producing control pressures corresponding to the respective guide blade adjusting program which, in turn, control the actuating mechanism for the guide blades to adjust the same to the predetermined positions; the control system is connected in particular with the fuel supply system of a gas turbine so as to utilize already existing parts.

The present invention relates to a control installation for the automatic adjustment of the movably arranged guide blades, especially of the power or output turbine, of a gas-turbine drive unit having an output turbine which is mechanically separate from the gas producer and which serves, in particular, for the drive of a vehicle.

With gas turbine drive units for the drive of motor vehicles, it is known to change the blade angle of the pivotally arranged guide blades of the output turbine in dependence on the compressor rotational speed, on the driving velocity and on the gas lever position in order to attain in the partial load range a higher efficiency and therewith a lower, specific fuel consumption and a good acceleration with avoidance of pumping of the compressor. Additionally, a braking effect for the vehicle is to be achieved from the drive unit by a corresponding positioning of the guide blades during the braking of the vehicle or possibly already upon retraction of the fuel lever into the idling position. The guide blades are thereby pivoted into such a position for that purpose that the propulsion gases enter the guide blade ring in a direction opposite the direction of rotation of the turbine wheel.

With the known prior art constructions, the actuation of the guide blades takes place by a hydraulically operating acuating installation which, as already mentioned, is controlled by the hydraulic installation of the automatic transmission in dependence on the rotational speed, the driving velocity and the gas lever position. The prior art control installation used for that purpose is complicated and expensive because individual control mechanisms are necessary for each influencing or control magnitude whose effects are superimposed on one another.

The present invention aims at creating a control installation which is simple in its construction, and at constructing the same in such a manner that control magnitudes and mechanism of the fuel control system, already present in gas turbine drive units, is used for this purpose.

The present invention is characterized by a pneumatic or hydraulic installation, whereby the latter is connected in particular to the fuel supply system, for the production of control pressures corresponding to the respective guide blade adjusting program, which control the actuating devices for the guide blades.

In realization of the main inventive concept of the present invention, it is further proposed for the purpose of producing the control pressures corresponding to the guide blade adjustment program, to connect a control circulatory system kept at a constant inlet or admission pressure with the fuel supply system, whereby a control member driven in dependence on the rotational speed, for example, a paraboloidal needle guided within a control slot or a cylinder slide valve provided with a control slot, operatively engages in the control circulatory system.

According to the present invention, a diaphragm arranged in a chamber may serve for the purpose of the "adjustment" of the control member engaging in the control circulatory system, which diaphragm is under the pressure of the fuel supply pump or one of the fuel supply pumps, preferably of a rotary or centrifugal pump operating as inlet pressure pump.

Additionally, the possibility exists, instead of actuating the control member by the aforementioned diaphragm, to actuate the same from a centrifugal governor driven by the gas generator.

According to a further feature of the present invention, the control circulatory system is appropriately connected with the fuel supply line downstream of the fuel supply pump or pumps and upstream of the fuel control device which meters the fuel quantity to be injected into the combustion chamber of the drive unit, whereby a pressure-maintaining valve is provided downstream of this connection which produces a constant inlet or supply pressure for the control circulatory system independently of the pressure prevailing in the fuel supply line.

Furthermore, the present invention essentially consists in that during the acceleration of the drive unit, an additional pressure impulse is superimposed, respectively, on the control pressures corresponding to the guide blade adjustment program, which effects that the guide blades are temporarily opened completely. According to the present invention, the pressure impulse which leads to the temporary complete opening of the guide blades during the acceleration of the drive unit, is initiated and/or controlled in dependence on the increase of the fuel quantity (injection quantity) produced in the fuel supply system or in the fuel regulator device. Actual installations and details for producing the pressure impulse in question are explained more fully hereinafter by reference to the drawing.

The actuating installation for the guide blades controlled either directly or indirectly by the control pressures produced in accordance with the present invention is constructed as conventional follow-up piston installation which essentially consists of a control mechanism and of a servo-mechanism whose working piston, actuating the guide blades, is driven or actuated by a working circulatory system (pressure oil circulatory system) that is controlled by the control mechanism which, in turn, is actuated according to the present invention in dependence on the control pressure produced in the control circulatory system.

The control mechanism of the follow-up piston system used within the frame of the present invention essentially consists in a conventional manner of a piston slide valve member and of a sliding sleeve member whereby the followup piston lever, actuated by the working piston, engages at the sliding sleeve member whereas the piston slide valve member is actuated by an elastic member, for example, by a set of cells installed in a chamber, which elastic member is under the influence of the control pressures.

Finally, the braking position of the guide blades is brought about in accordance with the present invention in that the follow-up piston lever is so actuated by a brake impulse transmitter that the working piston of the servo-mechanism displaces the guide blades into the braking position.

Accordingly, it is an object of the present invention to provide a control installation for the automatic actuation of the movable guide blades of a gas turbine drive unit which avoids by simple means the aforementioned shortcomings and drawbacks encountered in the prior art.

Another object of the present invention resides in a control installation for the automatic adjustment of the movably arranged guide blades of a gas turbine drive unit which is characterized by simplicity and low cost as well as reliability in operation.

A further object of the present invention resides in a control installation of the type described above which minimizes the number of the necessary parts by utilizing control systems and parts thereof already present in the gas turbine drive unit.

These and further objects, features, and advantages of the present invention will become more obvious from the following description when taken in connection with the accompanying drawing which shows, for purposes of illustration only, several embodiments in accordance with the present invention, and wherein:

FIG. 1a is a partial cross-sectional view, on an enlarged scale, of a detail of the installation of FIG. 1, illustrating the paraboloidal needle in an initial position A, prior to the accelerating operation;

FIG. 1b is a partial cross-sectional view, similar to FIG. 1a, and illustrating the position C of the paraboloidal needle after the accelerating operation;

Figure 1:
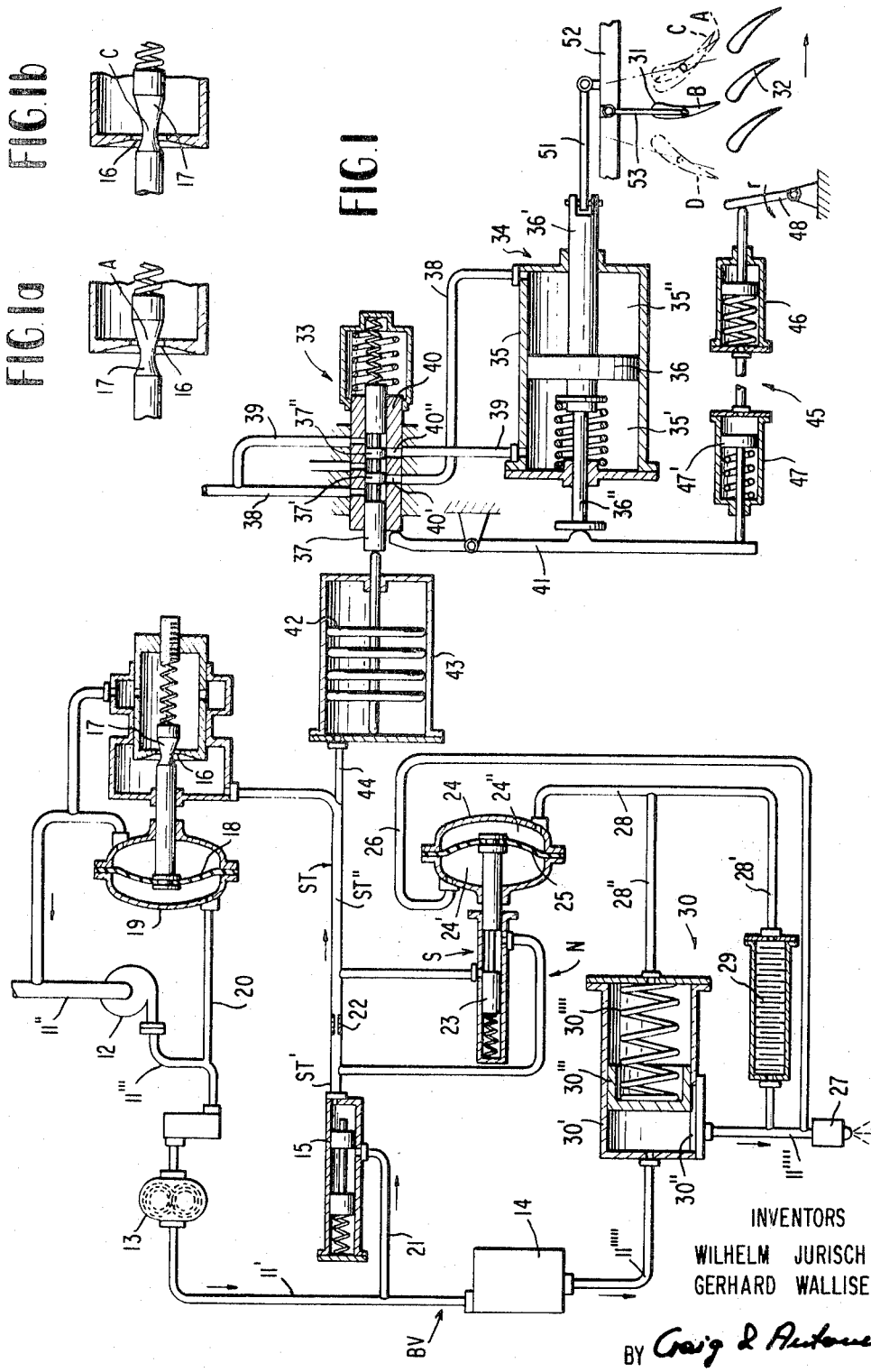
FIG. 1 is a schematic view of the control installation for the adjustment of the guide blades of the output turbine of a gas turbine drive unit in accordance with the present invention.
Figure 3:
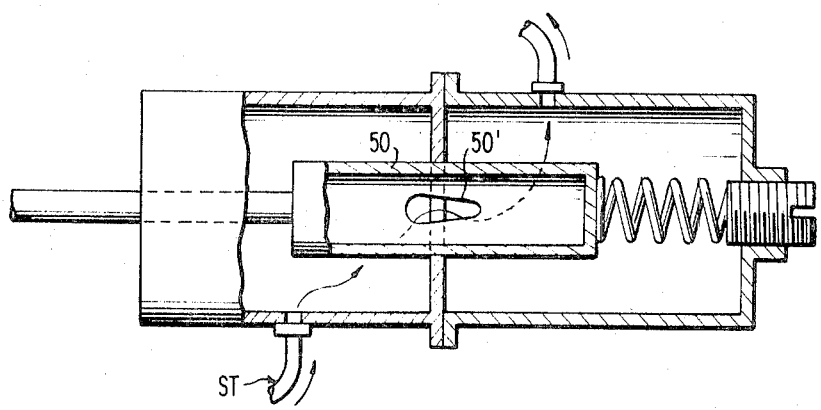
Figure 4:
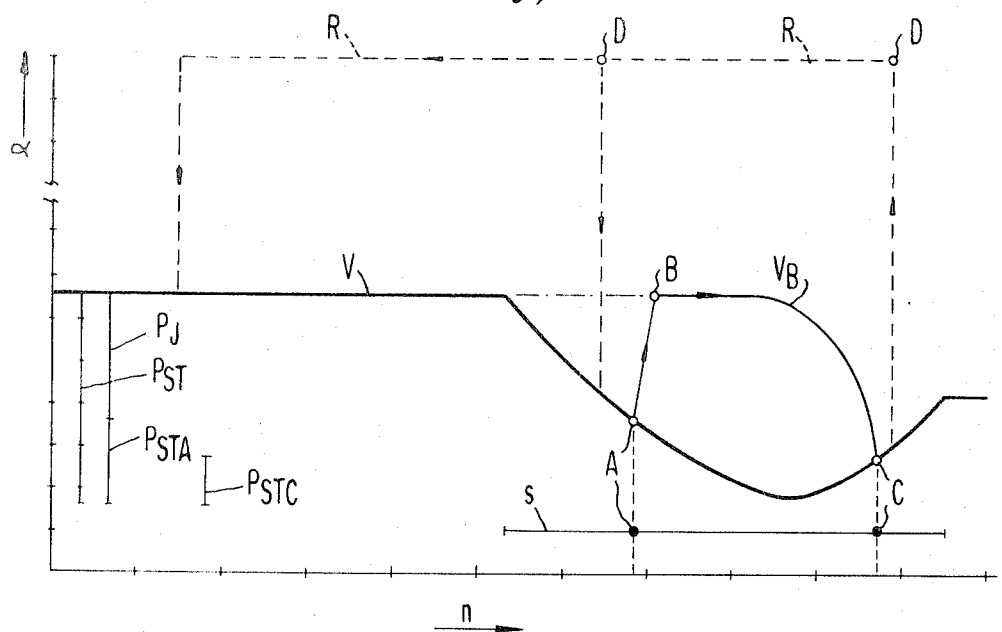

FIG. 3 is a partial cross-sectional view, on an enlarged scale, illustrating a modified embodiment of a control slide valve to be used in the place of the paraboloidal needle of FIG. 1; and FIG. 4 is a diagram of the guide blade adjusting program V and of the control pressures proportional thereto in dependence on the compressor rotational speed $n$ and on the path $s$ of the paraboloidal needle; and FIG. 5 shows a partially schematic diagram of the control installation for the adjustment of the guide blades of the output turbine of a gas turbine engine shown in cross-section.

Referring now to the drawing wherein like reference numerals are used throughout the various views to designate like parts, and more particularly to FIG. 1, a control circulatory system generally designated by reference characters ST is connected in parallel with the section 11′ of the fuel supply line (which forms a part of the entire fuel supply system BV) and more particularly downstream of the fuel supply pumps 12 and 13 and upstream of a conventional fuel control or regulator device 14; the parallelly connected control circulatory system ST terminates again in the pressureless section 11″ of the fuel supply line, upstream of the fuel supply pumps 12 and 13 as viewed in the direction of flow of the fuel.

The control circulatory system ST is kept at a constant inlet pressure, independent of the fuel pressure prevailing at any given time in the fuel supply line section 11″, with the aid of a pressure-maintaining valve 15 connected with the line section 11′ by way of a line 21. The control pressures in the control circulatory system ST are produced by a paraboloidal needle 17, guided within a control aperture 16, which is actuated by a diaphragm 18 that, in turn, is acted upon by the pressure of the fuel supply pump 12 (inlet pressure pump) which is constructed as rotary or centrifugal pump; the diaphgram 18 is arranged within a chamber 19 which is connected with the fuel supply line section 11‴ by way of a line 20.

Additionally, a pressure-reducing orifice 22 is provided in the control circulatory system ST whose purpose will be described more fully hereinafter in the description of the operation of the control installation of the present invention.

A branch circuit generally designated by reference character N branches off from the control circulatory system ST, and more particularly from the line section ST′ downstream of the pressure-maintaining valve 15 and upstream of the throttle 22; a closure valve mechanism generally designated by reference numeral S which includes a closure valve 23, is arranged in the branch line N. Furthermore, the mechanism S includes a diaphragm 25 arranged in a chamber 24. A line 26 leads from the chamber part 24′ to the line section 11⁗ which leads to the injection nozzles 27. A line 28 which is connected with the chamber part 24″, terminates with a line section 28′ on the backside or output side of an iterative throttling device 29 of any conventional construction whose front or inlet side is connected with the injection nozzle line section 11⁗. The line section 28″ terminates in the backside of the cylinder 30′ of a pressure transmitter generally designated by reference numeral 30. The cylinder 30′ is connected at its front end or input with the line section 11⁗′ of the fuel supply system BV and includes a throttle slot 30″ that is controlled by a piston 30‴ which is under the stress of a spring 30⁗. The two installations 29 and 30 therefore form together a differential pressure transmitter.

The actuating mechanism in the form of a conventional follow-up piston installation for the actuation of the guide blades 31 of the power or output turbine consists of a control mechanism generally designated by reference numeral 33 and of a servo-mechanism generally designated by reference numeral 34 with a working cylinder 35 and a working piston 36; the piston rod 36′ of the working piston 36 is pivotally connected a coupling member 51 which actuates an adjusting ring 52. The adjusting levers 53, which are rigidly secured at the pivot axes (pivot pins) of the individual guide blades 31, are supported at the ring 52 rotatably and longitudinally displaceably within small limits.

The control mechanism 33 consists principally of a spool-type piston slide valve member 37 having two control pistons 37′ and 37″ which control a pressure oil circulatory system with two line branches 38 and 39, and of a sliding sleeve member 40 provided with control bores 40′ and 40″, at which engages the follow-up piston lever 41 that is actuated by the piston rod part 36″. The piston slide valve member 37 is actuated by a package of pressure cells 42 which is arranged within a chamber 43 that is connected by way of a line (control pressure line 44) with the control circulatory system ST and more particularly with the line section ST′ thereof.

Reference numeral 45 generally designates a hydraulically operating brake impulse transmitter which includes a transmitter cylinder 46 actuated by a lever 48 and a receiver cylinder 47 whose piston 47′ engages by way of a rod at the follow-up piston lever 41.

Figure 2:
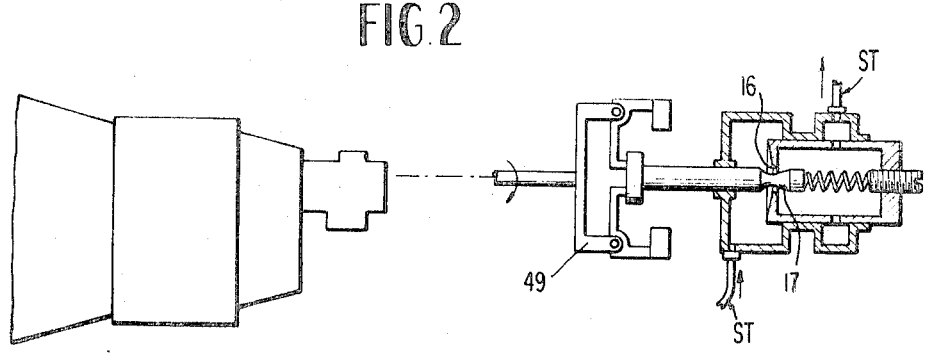
FIG. 2 is a partial cross-sectional view illustrating a modified embodiment of the drive and actuation of the paraboloidal needle in accordance with the present invention.

According to FIG. 2, the paraboloidal needle 17 is "adjusted" by a centrifugal governor 49 which is driven in dependence on the compressor rotational speed.

FIG. 3 illustrates a cylindrical slide valve 50 with a correspondingly dimensioned control slot 50′ in lieu of a paraboloidal needle 17.

In the diagram according to FIG. 4, the guide blade adjusting angle $\alpha$ and the control pressures $p_{ST}$ produced in the control circulatory system ST as well as the additional pressure impulse $p_J$ during acceleration are plotted against the compressor rotational speed $n$ and the path $s$ of the control member 17 or 50.

OPERATION

The operation of the control installation in accordance with the present invention is as follows:

At first, an operating point is assumed in the partial load range of the drive unit with a steady driving condition, which corresponds, for example, to the point A (FIG. 4) indicated on the adjusting curve V and on the paraboloidal needle path $s$; the paraboloidal needle 17 is thereby in the position shown in FIG. 1$a$, and more particularly by reason of the pressure magnitude temporarily prevailing in the line 20 which is produced by the rotary pump 12 in dependence on the prevailing rotational speed or by reason of the deflection of the flyweights of the centrifugal governor 49 according to FIG. 2.

For purposes of accelerating the drive unit, the fuel quantity to be injected is increased by the fuel regulator 14 and, as a result thereof, the differential pressure at the throttling slot 30″ is increased whereby the piston 30‴ is displaced toward the right as viewed in the drawing, which again entails or brings about a pressure increase in the line 28 and in the chamber part 24″ so that the blocking or closure valve 23 is displaced toward the left. The throttling orifice 22 is now by-passed by the now open branch circuit N which has as a consequence a control impulse $p_J$ with respect to the respective control pressure $p_{STA}$ conditioned by the occupied position (A) of the paraboloidal needle 17, whereby the higher pressure prevailing in the line section ST′, which corresponds to the largest cross-sectional area of passage between the individual guide blades 31, now also becomes effective in the line section ST″ and therewith also in the chamber 43. The cell packet 42 is further compressed thereby so that the control piston 37″ moves toward the left and thereby releases or opens up the supply of pressure oil to the chamber part 35′ of the working cylinder 35. The working piston 36 is immediately displaced toward the right and brings the guide blades into the position B which corresponds to the largest cross-sectional area of passage between the individual guide blades 31. In the meantime, the pressure-equalizing effect of the interative throttling device 29 becomes effective, i.e., the higher pressure tem- the lower pressure prevailing in the line section 11‴″ so that the closure valve 23 moves again toward the right into its closing position.

The gas generator of the drive unit has now reached a higher rotational speed as a result of the increased fuel supply so that the paraboloidal needle 17 has finally reached the position illustrated in FIG. 1$b$ as a result of the higher pressure of the rotary pump 12 which corresponds to the point C on the guide blade adjusting curve V. As a result of the now prevailing smaller control pressure $p_{STC}$, the guide blades 31 now assume a somewhat smaller adjusting angle (C) than in the point A.

During the braking of the vehicle, the lever 48 is pivoted in the direction of arrow $r$ whereby the piston 47′ in the receiver cylinder 47 is displaced toward the left. By way of the follow-up piston lever 41, the sliding sleeve member 40 is simultaneously displaced toward the right whereby the pressure oil supply into the chamber part 35′ is opened up or released so that the piston 36 is displaced toward the right and the guide blades 31 are pivoted into the position D (FIGS. 1 and 4) whereby the gas stream enters the turbine blading 32 opposite the direction of rotation of the turbine wheel. The braking operation is characterized in the diagram of FIG. 4 by the line R. After retraction of the lever 48, the actuating installation 33, 34 is again subjected to the control pressure produced in the control circulatory system ST which means that the guide blades 31 pivot into a position that corresponds to any point along the line V.

While we have shown and described only several embodiments in accordance with the present invention, it is understood that the same is not limited thereto but is susceptible of numerous changes and modifications as known to a person skilled in the art. For example, the possibility exists without difficulty within the frame of the present invention that the pressure medium circulation in the control system ST is effected by a pressure source or supply pump of its own, i.e., that the control circulatory system ST then is not connected to the fuel supply system BV. Consequently, it is obvious that the present invention is susceptible of numerous changes and modifications as known to a person skilled in the art, and we therefore do not wish to be limited to the details shown and described herein but intended to cover all such changes and modifications as are within the scope of those skilled in the art.

We claim:

1. A control installation for the automatic adjustment of movably arranged guide blades, especially of the output turbine, of a gas turbine drive unit having an output turbine mechanically separate from the gas producer thereof, which serves in particular for the drive of a vehicle, characterized by control means operable by a pressure medium for producing control pressures corresponding to the guide blade adjusting program, said control means including a control circulatory means kept under substantially constant inlet pressure and a control device actuated in dependence on the rotational speed of the gas producer, which is operatively associated with said control circulatory means, and actuating means for the guide blades controlled by said control pressures, wherein the gas turbine unit includes a fuel supply system, said control circulatory means of said control means for producing the control pressures being operatively connected in parallel with said fuel supply system to receive control pressure impulses therefrom in dependence upon variations in fuel quantity produced therein.

2. A control installation according to claim 1 wherein said control means is operatively connected with another pressure medium system already in existence in the gas turbine drive unit for other purposes.

3. A control installation according to claim 1 wherein said control device includes a paraboloidally shaped needle guided within a control aperture.

4. A control installation according to claim 1, wherein said control device includes a cylindrical slide valve member provided with a control slot.

5. A control installation according to claim 1, further comprising diaphragm means arranged within a chamber for adjusting said control device, said diaphragm means being under the pressure of a fuel supply pump of the fuel supply system.

6. A control installation according to claim 1, wherein said control device is actuated by centrifugal governor means driven by the gas generator.

7. A control installation according to claim 5, wherein the fuel supply system includes fuel supply pump means and fuel regulating means operatively connected with each other by a fuel supply line, said control circulatory means being connected with the section of the fuel supply line downstream of the fuel supply pump means and upstream of the fuel regulating means, and pressure-maintaining valve means in said circulatory means downstream of the connection thereof with said fuel supply line section for producing the substantially constant inlet pressure for the control circulatory means independently of the pressure prevailing in the fuel supply line, the magnitude of said substantially constant inlet pressure corresponding to the complete opening of the guide blades.

8. A control installation according to claim 1, further wherein means are provided for superimposing said control pressure impulse over the control pressures corresponding to the guide blade adjusting program during the acceleration of the drive unit, and said means for superimposing the additional pressure impulse being operable to temporarily completely open the guide blades.

9. A control installation according to claim 8, wherein the pressure impulse is initiated in dependence on the fuel quantity increase produced in fuel regulating means of the drive unit during acceleration thereof.

10. A control installation according to claim 9, wherein said control circulatory means includes throttle means, by-pass circuit means adapted to by-pass said throttle means during the acceleration for the production of said pressure impulse, and closure valve means in said by-pass circuit means and opened by the fuel quantity increase produced by the fuel regulator means during the acceleration of the drive unit.

11. A control installation according to claim 8, wherein said control circulatory means includes throttle means, by-pass circuit means adapted to by-pass said throttle means during the acceleration for the production of said pressure impulse, and closure valve means in said by-pass circuit means and opened actuated during the acceleration of the drive unit.

12. A control installation according to claim 7, further comprising means for superimposing an additional pressure impulse over the control pressures corresponding to the guide blade adjusting program during the acceleration of the drive unit, said means for superimposing the additional pressure impulse being operable to temporarily completely open the guide blades.

13. A control installation according to claim 12, wherein the pressure impulse is initiated in dependence on the fuel quantity increase produced in the fuel regulating means during the acceleration of the drive unit.

14. A control installation according to claim 13, wherein said control circulatory means includes throttle means, by-pass circuit means adapted to by-pass said throttle means during the acceleration for the production of said pressure impulse, and closure valve means in said by-pass circuit means and opened by the fuel quantity increase produced by the fuel regulator means during the acceleration of the drive unit.

15. A control installation according to claim 14, further comprising differential pressure transmitter means in the fuel supply line downstream of the fuel regulator means including pressure transmitter cylinder means having spring-loaded piston means controlling a fuel-metering aperture means, throttle means connected in parallel to the pressure transmitter cylinder means operatively connected with its input side to the fuel line section leading to the fuel nozzles, and further actuating means for actuating the closure valve means in the by-pass circuit means including diaphragm means arranged in a chamber means having two parts, one of said two parts of said chamber means being indirectly connected with the fuel line section leading to the fuel nozzles by way of lines connected with the output side of the pressure transmitter cylinder means as well as with the output side of the throttle means so that in case of an increase in the fuel qunatity in the line section between the fuel regulator means and the cylinder means, the closure valve means is opened whereas the other of the two parts of the chamber means is operatively connected directly with the line section leading to the fuel nozzles by way of a further line which terminates in the fuel-nozzle line section downstream of the pressure transmitter cylinder means and of the throttle means.

16. A control installation according to claim 15, wherein said throttle means is an iterative-type throttling device.

17. A control installation according to claim 15 further comprising means for producing a braking effect for the rotating turbine wheel by pivoting the guide blades into a braking position during predetermined deceleration including transmitting means for transmitting the braking impulse in such a manner that the working piston displaces the guide blades into the braking position.

18. A control installation according to claim 17, wherein the means for producing the braking effect is operable already in the idling position of the fuel lever when driving above a predetermined relatively low velocity.

19. A control installation according to claim 18, wherein the transmitting means for transmitting the brake impulse includes hydraulic transmitter cylinder means and receiver cylinder means having a piston operatively connected with a follow-up piston lever means.

20. A control installation according to claim 7, wherein said control circulatory means includes throttle means, by-pass circuit means adapted to by-pass said throttle means during the acceleration for the production of said pressure impulse, and closure valve means in said by-pass circuit means and opened by the fuel quantity increase produced by the fuel regulator means during the acceleration of the drive unit.

21. A control installation according to claim 20, further comprising differential pressure transmitter means in the fuel supply line downstream of the fuel regulator means including pressure transmitter cylinder means having spring-loaded piston means controlling a fuel metering aperture means, throttle means connected in parallel to the pressure transmitter cylinder means operatively connected with its input side to the fuel line section leading to the fuel nozzles, and further actuating means for actuating the closure valve means in the by-pass circuit means including diaphragm means arranged in a chamber means having two parts, one of said two parts of said chamber means being indirectly connected with the fuel line section leading to the fuel nozzles by way of lines connected with the output side of the pressure transmitter cylinder means as well as with the output side of the throttle means so that in case of an increase in the fuel quantity in the line section between the fuel regulator means and the cylinder means, the closure valve means is opened whereas the other of the two parts of the chamber means is operatively connected directly with the line section leading to the fuel nozzles by way of a further line which terminates in the fuel-nozzle line section downstream of the pressure transmitter cylinder means and of the throttle means.

22. A control installation according to claim 1, further comprising means for producing a braking effect for the rotating turbine wheel by pivoting the guide blades into a braking position during predetermined deceleration including transmitting means for transmitting a braking impulse in such a manner that a working piston displaces the guide blades into the braking position.

23. A control installation according to claim 22, wherein the means for producing the braking effect is operable already in the idling position of the fuel lever when driving above a predetermined relatively low velocity.

24. A control installation according to claim 23, wherein the transmitting means for transmitting the brake impulse includes hydraulic transmitter cylinder means and receiver cylinder means having a piston operatively connected with a follow-up lever means.

References Cited

UNITED STATES PATENTS

| | | | |
|---|---|---|---|
| 2,625,789 | 1/1953 | Starkey | 60—39.25 X |
| 2,912,824 | 11/1959 | Van Nest et al. | 60—39.16 |
| 2,918,790 | 12/1959 | Schoch | 60—39.16 X |
| 2,977,757 | 4/1961 | Mock | 60—39.28 |
| 3,046,738 | 7/1962 | Jackson et al. | 60—39.25 |
| 3,124,931 | 3/1964 | Mock | 60—39.16 |
| 3,168,810 | 2/1965 | Gatzemeyer et al. | 60—39.16 |
| 3,325,994 | 6/1967 | Zaba et al. | 60—39.25 |
| 3,181,295 | 5/1965 | Pauwels et al. | 60—39.16 |
| 3,357,178 | 12/1967 | Meyers | 60—39.25 |

AL L. SMITH, Primary Examiner

U.S. Cl. X.R.

60—39.25; 192—3 A